Feb. 7, 1933.  G. H. BARBER ET AL  1,896,605

FLASH LIGHT

Filed Jan. 8, 1930

Inventors.
George H. Barber
Frank S. Stinson
Goodrich B. Pratt
By their Attorneys
Bohleber & Ledbetter Patented Feb. 7, 1933

1,896,605

UNITED STATES PATENT OFFICE

GEORGE H. BARBER, OF NEW ROCHELLE, NEW YORK, AND FRANK G. STIMSON, OF BELLEVILLE, AND GOODRICH B. PRATT, OF JERSEY CITY, NEW JERSEY, ASSIGNORS TO BOND ELECTRIC CORPORATION, OF JERSEY CITY, NEW JERSEY, A CORPORATION OF DELAWARE

FLASH LIGHT

Application filed January 8, 1930. Serial No. 419,254.

The present invention relates to flash lights and embodies, more specifically, an improved pocket flash light in which the elements thereof have been designed to afford a more perfect electrical circuit and simplified construction in addition to embodying an improved mechanical device.

In existing flash light constructions the casing has either been of metal formed with threaded ends, or of fiber with metallic threaded end members onto which the top and the bottom caps are screwed. Metallic casings require insulation of the parts forming the circuit which complicates assembly and increases both cost of manufacture and assembly. The fiber casings likewise require additional parts which complicates manufacture.

An effort has been made to cut threads directly in the fiber casings described above, in this manner dispensing with the necessity of the threaded metallic end members. When cut, however, the body of the fiber has not sufficient strength to withstand the strain imposed by screwing on the caps and the threads soon break away, rendering the flash light useless.

The present invention does away with the old fiber and metallic forms and utilizes a one piece moulded casing formed in an improved manner in order that the caps may be threaded directly thereonto. Further provision is made for maintaining the threads tight regardless of irregularities or inaccuracies due to shrinkage and other factors in manufacture. There is further embodied in the moulded casing an improved electrical system by means of which an effective electrical circuit is maintained at all times.

From the foregoing, it will be seen that an object of the present invention is to provide a unitary moulded casing, the casing having the required threads moulded directly thereinto.

A further object of the invention is to provide a flash light of the above character in which is embodied an improved electrical system.

Yet another object of the invention is to provide a flash light of the above character in which provision is made for maintaining the parts in a securely assembled position regardless of inaccuracies or irregularities in manufacture, or, for example, due to shrinkage, etc.

Further objects, not specifically enumerated above, will be apparent as the invention is described in greater detail in connection with the accompanying drawing, wherein.

Figure 1:
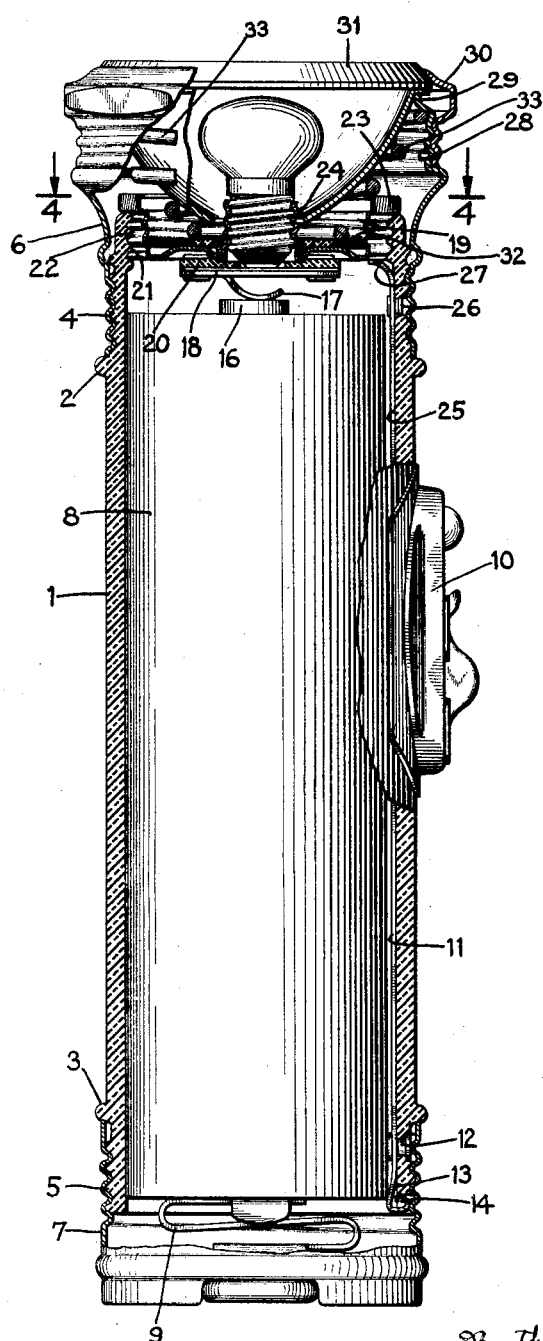
Figure 1 is a view in longitudinal section through a flash light constructed in accordance with the present invention and partly broken away to show the details of construction of the lamp socket support and hood.
Figure 2:
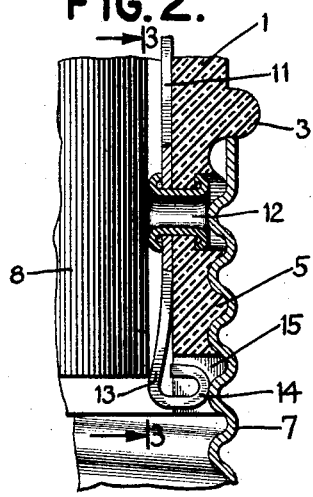
Figure 2 is an enlarged detail view of the contact elements adjacent the bottom cap whereby electrical contact with the latter is effectively made when the cap is screwed on to the casing.
Figure 3:
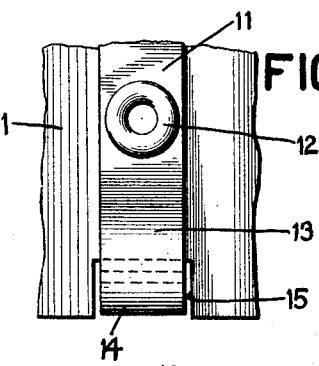
Figure 3 is a segmental view in side elevation, showing the contact elements of Figure 2.
Figure 4:
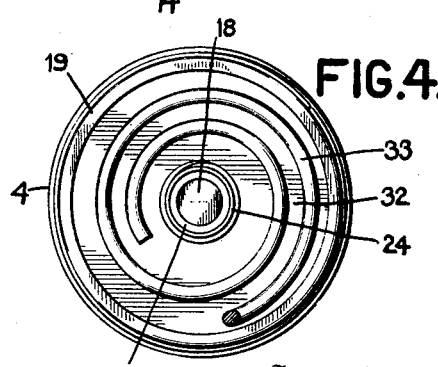
Figure 4 is a transverse sectional view taken on the line 4—4 of Figure 1.

Referring more specifically to the drawing, reference character 1 designates a unitary moulded casing shown as having top and bottom circumferential ribs 2 and 3, respectively. This casing is preferably moulded from plastic material such as bakelite, casein, catalin, karolith, beetle, phenol, or casein products, thus affording suitable insulation for the flash light. External top and bottom threads 4 and 5, respectively, are either cut, moulded, rolled or ground in the casing either during, or after moulding to receive a threaded hood 6 and threaded bottom cap 7, respectively. In the illustrated embodiment, the interior and exterior threads are formed in different transverse planes in order to take advantage of the maximum effective thickness of material. While the extreme condition has been shown, and offset arrangement of the threads is contemplated in this aspect of the invention although it will be appreciated that in some situations this offset relationship need not be adhered to.

The usual battery 8 is received within the casing 1, the zinc battery casing contacting with the bottom cap by means of a positioning spring 9. A circuit switch 10 is secured to the side of the casing, and is connected electrically with the bottom cap by means of a contact strip 11 which may be secured to the casing by means of an eyelet 12, preferably secured in the casing wall conveniently at the threaded portion 5 thereof. An extension 13 is formed on the contact strip 11 and has an outwardly reversely bent portion 14 which is preferably received within a recess or notch 15 in the lower extremity of the casing 1. The outwardly extending portion 14 is preferably of such length as to lie normally in the path of the threads of the bottom cap 7. It is pressed thereagainst by the resiliency of the extension 13 which serves as a leaf spring fastened at 12, and thus affords an effective contact with such threads.

The switch 10 may be of any convenient construction and since it forms no part of the present invention, further description herein is deemed unnecessary. The positive terminal 16 of the battery is electrically connected with a combined shock absorbing thrust member and contact 17 which is carried upon a contact plate 18. This contact plate is mounted upon the bottom of a cup shaped lamp socket support 19 through an insulating plate 20. The cup shaped lamp socket support is formed with threads 21 to engage internal threads 22 formed in the casing, at the upper end thereof. In order to facilitate the assembly and removal of the lamp support, the upper periphery thereof is knurled as at 23. A threaded socket 24, formed in the support 19 receives the base of an electric lamp in a well known manner, the central terminal thereof being moved against the plate 18 as the lamp is screwed into place, through registering holes in the bottom of the cup 19 and insulation 20.

In order that the lamp socket support may be connected to the switch 10, a contact strip 25 is mounted within the casing 1, being secured thereto by an eyelet 26. This eyelet 26 is countersunk so that no electrical contact is made with hood 6, so that, if, for instance, the flashlight were laid on a sheet of metal, no electrical circuit would be completed between the bottom cap 7 and hood 6 which would energize the lamp and drain the battery. A curved resilient spring end 27, formed on the strip 25, is engaged by the lamp socket support as the latter is threaded down into position thus completing the circuit between the lamp socket and the switch 10.

The hood 6 is shown as formed with a threaded extremity 28 having an inwardly extending flange 29. A lens ring 30, holding a lens 31 and reflector to the flange 29 in the usual manner is threaded over the threads 28, this structure conforming to well known practice. Obviously other types of hoods or end constructions are equally applicable.

Within the lamp socket support, and about the lamp socket 24, an insulating disc 32 is mounted. This disc may be seated within the lamp socket support and serve as a seat for a coil spring 33 which is self-expanding outwardly to engage the threads 28 on the hood, or a shoulder formed in the hood adjacent the threads. Being normally constricted by the hood and disc 32, this spring urges the hood against the threads 4 of the casing 1 to take up any play due to possible shrinkage of the casing or irregularities or inaccuracies in manufacture. At the same time, the spring 33 urges the lamp socket support inwardly against the threads 22 thus taking up any play between the threads on the lamp socket support and the threads on the casing.

From the foregoing, it will be seen that the battery will be fully cushioned against movement in an axial direction and that the electrical circuit is effectively maintained at all times. An adequate contact is preserved between the bottom cap and the lower contact strip, while the threading of the lamp socket support within the casing affords ample contact between the upper contact strip and the lamp socket.

By moulding the casing with the top and bottom threads, as described hereinbefore, considerable labor and material is saved over the old forms of flash lights. Not only is the manufacture thereof expedited but the resulting product is found to be more attractive and more serviceable. No design heretofore made has recognized the desirability and advantages of using a moulded insulating casing of the above character and while the invention has been described with specific reference to the accompanying drawing, it is not to be limited, save as defined in the appended claims.

What is claimed is:

1. In combination with a flash light casing, a cup shaped lamp socket support threaded therein, and a hood threaded externally thereon, an insulating washer within the support, and a coil spring normally expanding within and against the walls of the hood and exerting an axial force against the insulating washer.

2. In combination with a flash light casing, a cup shaped lamp socket support threaded therein, and a hood threaded externally thereon, and a coil spring normally expanding within and against the walls of the hood and exerting an axial force against the cup shaped member.

3. In combination with a flashlight casing formed inwardly at one end with threads and outwardly at the same end with threads, a hood threaded on the outward threads, a cup shaped lamp socket support threaded within the casing, the socket support being inserted within the casing with the open end extending outwardly, a lamp socket secured to and in direct contact with the bottom of the support, an insulating washer in the bottom of the socket support, and a spring engaging the hood and the washer and exerting an axial thrust upon the hood and the lamp socket support.

In testimony whereof we affix our signatures.

GEORGE H. BARBER.
FRANK G. STIMSON.
GOODRICH B. PRATT.